(12) United States Patent
Holson et al.

(10) Patent No.: US 10,362,038 B2
(45) Date of Patent: *Jul. 23, 2019

(54) MAINTAINING A LIMITED USER PROFILE FOR SOCIAL NETWORKING SYSTEM USERS UNABLE TO ESTABLISH A USER PROFILE

(71) Applicant: Facebook, Inc., Menlo Park, CA (US)

(72) Inventors: Benjamin Michael Holson, Mountain View, CA (US); Dan Barak, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,661

(22) Filed: Dec. 18, 2017

(65) Prior Publication Data

US 2018/0109536 A1  Apr. 19, 2018

Related U.S. Application Data

(63) Continuation of application No. 15/277,703, filed on Sep. 27, 2016, now Pat. No. 9,871,802, which is a
(Continued)

(51) Int. Cl.
*G06F 7/04* (2006.01)
*G06F 15/16* (2006.01)
(Continued)

(52) U.S. Cl.
CPC ........ *H04L 63/102* (2013.01); *H04L 63/0892* (2013.01); *H04L 67/306* (2013.01); *G06Q 50/01* (2013.01); *H04L 63/20* (2013.01)

(58) Field of Classification Search
USPC ......................................................... 726/12
See application file for complete search history.

(56) References Cited

U.S. PATENT DOCUMENTS

2008/0172407 A1   7/2008   Sacks
2011/0072039 A1   3/2011   Tayloe
(Continued)

FOREIGN PATENT DOCUMENTS

JP   2010-073168 A    4/2010
JP   2010-282631 A   12/2010
KR   10-2001-0105024 A   11/2001

OTHER PUBLICATIONS

Australian Government, IP Australia, Examination report No. 1 for standard patent application, Australian Patent Application No. 2015288253, Feb. 9, 2017, three pages.
(Continued)

*Primary Examiner* — Jeffrey C Pwu
*Assistant Examiner* — Samuel Ambaye
(74) *Attorney, Agent, or Firm* — Fenwick & West LLP

(57) ABSTRACT

A social networking system maintains a limited user profile associated with a user of the social networking system who does not satisfy one or more criteria for the social networking system to maintain a user profile. The limited user profile includes information describing the user and allows the user to be associated with limited types of interactions with the social networking system. An administrator is associated with the limited user profile and may modify information associated with the limited user profile as well as authorize or deny interactions involving the limited user profile. When the user satisfies criteria for the social networking system maintaining a user profile, the social networking system generates a user profile based on information in the limited user profile and prior interactions involving the limited user profile.

20 Claims, 2 Drawing Sheets

Related U.S. Application Data continuation of application No. 14/329,670, filed on Jul. 11, 2014, now Pat. No. 9,479,510.

(51) Int. Cl.
*G06F 17/30* (2006.01)
*H04L 29/06* (2006.01)
*H04L 29/08* (2006.01)
*G06Q 50/00* (2012.01)

(56) References Cited

U.S. PATENT DOCUMENTS

| | | | |
|---|---|---|---|
| 2011/0209192 A1* | 8/2011 | LeClerc Greer | G06F 21/32 726/1 |
| 2012/0166532 A1 | 6/2012 | Juan et al. | |
| 2014/0150068 A1* | 5/2014 | Janzer | H04L 63/20 726/4 |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |

OTHER PUBLICATIONS

Japan Patent Office, Office Action, Japanese Patent Application No. 2017-501234, dated Jun. 6, 2017, five pages.

Korean Intellectual Property Office, Office Action, Korean Patent Application No. 10-2017-7002348, dated Feb. 14, 2017, six pages.

PCT International Search Report and Written Opinion, PCT Application No. PCT/US2015/035483, Aug. 31, 2015, twelve pages.

United Stated Office Action, U.S. Appl. No. 14/329,670, dated Feb. 25, 2016, 20 pages.

United States Office Action, U.S. Appl. No. 15/277,703, dated Feb. 23, 2017, 38 pages.

\* cited by examiner

MAINTAINING A LIMITED USER PROFILE FOR SOCIAL NETWORKING SYSTEM USERS UNABLE TO ESTABLISH A USER PROFILE

CROSS REFERENCE TO RELATED APPLICATIONS

This application is a continuation of U.S. application Ser. No. 15/277,703, filed Sep. 27, 2016, which is a continuation of U.S. application Ser. No. 14/329,670, filed Jul. 11, 2014, now U.S. Pat. No. 9,479,510, which are both incorporated by reference in their entireties.

BACKGROUND

This disclosure relates generally to social networking systems, and in particular to identifying advertisement content eligible for presentation to a social networking system user.

A social networking system allows users to connect to and to communicate with other users of the social networking system. Users create profiles on a social networking system that are tied to their identities and include information about the users, such as interests and demographic information. The users may be individuals or entities such as corporations or charities. Creating and maintaining a user profile on a social networking system allows a user to easily exchange information with other social networking system users.

Many social networking systems enforce terms of service limiting creation of user profiles to users having characteristics satisfying the terms of service. For example, terms of service limit creation of a user profile to users indicating they have at least a minimum age. As a specific example, a social networking system limits creation of a user profile to users that are at least 13 years old. This prevents users under 13 years old from creating a user profile maintained by the social networking system, which in turn prevents those users from exchanging content through the social networking system.

A conventional social networking system also allows a user to associate users with content maintained by the social networking system by associating metadata with content identifying users associated with the content. For example, a social networking system associates one or more tags with an image, or other content item, to identify users associated with the image or other content item. A user may associate an additional user with content by selecting the content via the social networking system and specifying an identifier associated with the additional user. When an additional user is associated with content, the content is associated with the additional user's user profile and is presented along with other information associated with the additional user. However, in conventional social networking systems, it is difficult to associate entities that are not users of the social networking system with content maintained by the social networking system. For example, if a social networking system requires an entity (e.g., a user) being associated with content to approve of the association, the user is unable to receive a request to approve the association if the entity is not a user of the social networking system.

However, users of a social networking system often seek to share content via the social networking system about entities that are unable to maintain a user profile on the social networking system, such as children less than a threshold age or pets. Often, a user associates itself with content about an entity unable to maintain a user profile on the social networking system to distribute the content to other social networking system users. However, because this content is associated with the user rather than the entity to which the content pertains, subsequent retrieval and association of the content with the entity difficult, and social networking system users are unable to establish connections with the entity to which the content pertains.

SUMMARY

A social networking system allows a user to request creation of a limited user profile associated with an additional user who does not satisfy one or more criteria for maintaining a user profile via the social networking system. A limited user profile is associated with a reduced set of permissions than a conventional user profile, limiting actions capable of being performed by the additional user associated with the limited user profile. The reduced set of permissions associated with the limited user profile may prevent presentation of a profile page associated with the limited user profile, prevent the additional user associated with the limited user profile from sending messages to other social networking system users, or otherwise limit actions the additional user may perform. In one embodiment, the limited user profile disallows any outward communications in the social networking system, such as messaging, posting, liking, commenting, etc. In this embodiment, the limited user profile is an object in the social networking system that can be referenced, such as being tagged in content (or otherwise associated with content) and storing a limited set of information about the user on a profile page, but is otherwise functionless unless and until it is converted into a normal user profile.

The social networking system can also prompt the user to create a limited user profile associated with the additional user of the social networking system based on a characteristic determined of the additional user by application of a face analysis algorithm on an image of the additional user. The face analysis algorithm can be a face detection algorithm, iris detection algorithm, or any other suitable fingerprinting, identification or verification algorithm and determined characteristics include age, gender, relationship status, work history, academic history, location, timestamps, or any other suitable information that can be obtained from the social networking system. In other embodiments, the social networking system will only prompt the user to create a limited user profile associated with the additional user if a determined characteristic of the additional user by application of a face analysis algorithm exceeds a threshold probability or value associated with the determined characteristic. In these embodiments, responsive to the prompt, the social networking system can receive a request to create the limited user profile associated with the additional user.

The user may request creation of the limited user profile if the additional user has less than a threshold age, the user requests generation of a limited user profile associated with the additional user by the social networking system. In some embodiments, the user indicates a type of relationship to the additional user when requesting creation of the limited user profile, such as a familial relationship or other suitable relationship with the additional user. When requesting creation of the limited user profile, the user specifies information identifying the additional user, which is included in the limited user profile. Examples of information identifying the additional user include: a name of the additional user, an image associated with the additional user, and events associated with the additional user.

The user requesting creation of the limited user profile may identify the permissions associated with the limited user profile, allowing the user to regulate actions capable of being performed relative to the limited user profile. Alternatively, the social networking system identifies the permissions associated with the limited user profile based on stored preferences or configuration information. Additionally, the user specifies one or more privacy settings associated with the limited user profile, with a privacy setting identify one or more users capable of authorizing interactions with the limited user profile. When a requesting user of the social networking system requests to interact with the limited user profile, a user specified by a privacy setting associated with the limited user profile is notified of the requested interaction and determines whether to authorize or deny the interaction. For example, a privacy setting identifies a user capable of authorizing a connection to the limited user profile, and when a requesting user requests establishment of a connection to the limited user profile, the identified user is notified and determines whether to authorize or deny the connection. Different privacy settings may be associated with different types of interactions, allowing different users to authorize different types of interactions with the limited user profile.

Based on the information identifying the additional user in the request, the one or more identified permissions, and the determined privacy settings, the social networking system generates and stores the limited user profile. An association between the user and the limited user profile is also stored, allowing subsequent identification of the user that requested the limited user profile. When the additional user satisfies criteria for the social networking system maintaining a user profile, the social networking system generates a user profile from the limited user profile. Connections between the limited user profile and other user profiles and interactions associated with the limited user profile are associated with the user profile generated from the limited user profile. For example, when a user associated with a limited user profile reaches a minimum age, a user profile is generated based on information in the limited user profile and connections with the limited user profile are used to generate connections between the user profile and other user profiles. Additionally, content associated with the limited user profile is associated with the user profile generated from the limited user profile, allowing the user profile to preserve associations between content and the limited user profile. In some embodiments, an increased number of permissions are associated with the limited user profile as a user associated with the limited user profile satisfies various criteria. For example, as the user associated with the user profile increases in age, an increasing amount of permissions are associated with the limited user profile.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
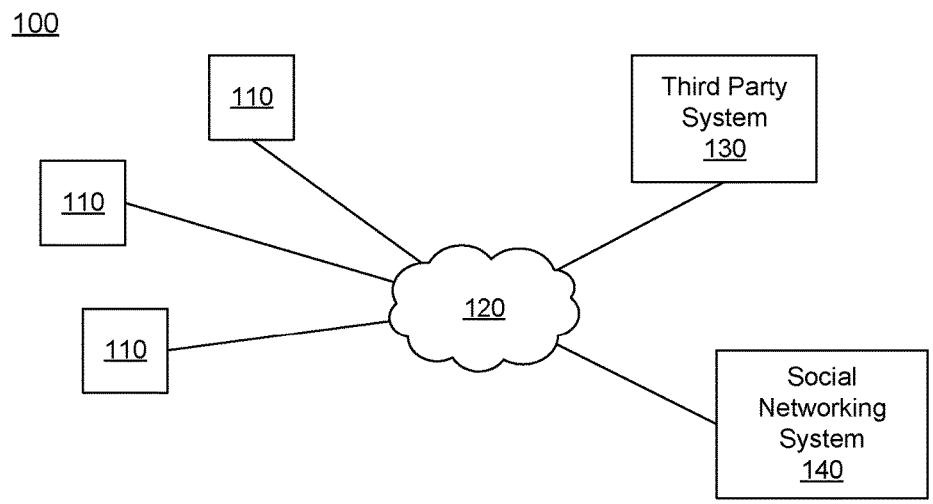
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
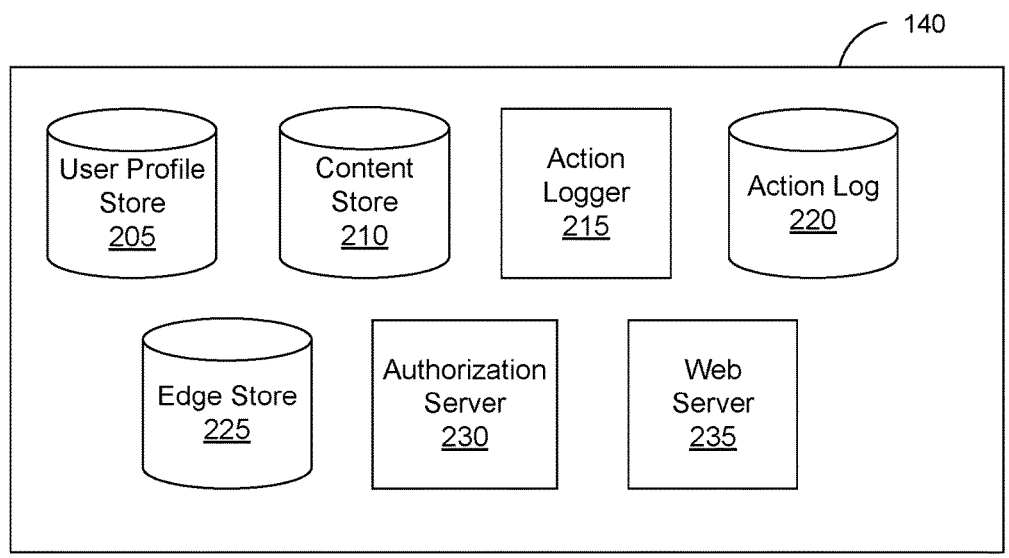
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, an authorization server 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

The user profile store 205 includes one or more limited user profiles associated with users of the social networking system that do not satisfy one or more criteria for the social networking system 140 to maintain a user profile. For example, a limited user profile is associated with a user who is less than a threshold age, such as an age specified by terms of service enforced by the social networking system 140. A limited user profile is also associated with a user that satisfies criteria for the social networking system 140 maintaining a user profile. For example, a limited user profile is associated with a user less than a threshold age for maintaining a user profile and is also associated with a parent or guardian of the user. Hence, when created, a limited user profile is associated with a user and also with one or more other users, such as a user who requested creation of the limited user profile. The other users may act as administrators of the limited user profile and modify or access information included in the limited user profile; for example, a user requests creation of a limited user profile for an additional user that is a child of the user, and the user may subsequently modify information in the limited user profile associated with the additional user. As an example, users that are parents of an additional user are identified as administrators of a limited user profile associated with the additional user, allowing one or more of the users that are parents to maintain the limited user profile.

Additionally, content associated with the limited user profile may also be associated with a user profile of the user who requested creation of the limited user profile or with one or more other users identified as administrators of the limited user profile. For example, check-ins associated with a limited user profile or images identifying the additional user profile are also associated with a user profile of the user who requested creation of the limited user profile. Hence, content associated with the limited user profile may be distributed to social networking system users connected to users identified as administrators of the limited user profile.

A limited user profile is associated with a reduced set of permissions relative to a user profile, limiting the interactions capable of being performed that involve the limited user profile. For example, a profile page including information from the limited user profile is not displayed to other users or messages are incapable of being sent or received by a user associated with a limited user profile. In some embodiments, permissions associated with a limited user profile are specified by a user requesting creation of the limited user profile; for example, a user requests creation of a limited user profile for an additional user that is the user's child and specifies permissions associated with the limited user profile when requesting creation of the limited user profile. As another example, users of the social networking system 140 may be prevented from establishing a connection with a user associated with a limited user profile. However, users of the social networking system 140 may receive information identifying content associated with the limited user profile if another user identified by a permission authorizes the users to receive content associated with the limited user profile. Similarly, a connection from a requesting user to a user associated with a limited user profile may be established if an additional user identified by a permission associated with the limited user profile authorizes the connection. In some embodiments, permissions associated with a limited user profile may be modified over time to increase the interactions capable of being performed by a user associated with the limited user profile over time. For example, as a user associated with a limited user profile increases in age, additional types of interactions may be performed that involve the user associated with the limited user profile (e.g., when the user associated with the limited user profile reaches a threshold age, social networking system users may establish connections to the user associated with the limited user profile).

Information describing a user is also included in a limited user profile associated with the user. When requesting creation of a limited user profile information describing a user for which the limited user profile is created is provided. Examples of information identifying the user associated with the limited user profile include a name of the user, an image associated with the user, a gender of the user, and an age or date of birth of the user. Additionally one or more events associate with the user may also be specified; these events may be names and dates corresponding to actions performed by the user (e.g., a first party, taking first steps, etc.). In some embodiments, a type or description of the user associated with the limited user profile is also included in the limited user profile. For example, the limited user profile indicates if the associated user is a human or an entity other than a human (e.g., an animal), and may include information describing an entity other than a human (e.g., a species of animal).

One or more privacy settings are also associated with the limited user profile. In some embodiments, privacy settings are specified by a user that requested creation of the limited user profile or by a user identified as an administrator of the limited user profile. A privacy setting determines accessibility of information in the limited user profile to other social networking system users or interaction with the limited user profile by other social networking system users. In various embodiments, a privacy setting associated with a limited user profile identifies a type of interaction with the limited user profile and a user, or users, capable of authorizing the type of interaction with the limited user profile. Privacy settings associated with different types of interactions may specify different users capable of authorizing the types of interactions. For example, a privacy setting identifies one or more users capable of authorizing an association between the limited user profile and content (e.g., tagging the user associated with the limited user profile in an image); when another social networking system user requests to associate the user associated with the limited user profile with content, the one or more users identified by the privacy setting are notified. One or more of the users identified by the privacy setting communicate an approval or a denial to the social networking system 140, and the social networking system 140 associates the user associated with the limited user profile with content if an approval is received from one or more of the identified users. Examples of interactions associated with a privacy setting for a limited user profile include: associating content with the user associated with the limited user profile, accessing content associated with the user associated with the limited user profile, establishing a connection with the user associated with the limited user profile, and receiving information describing content associated with the user associated with the limited user profile. However, any suitable interaction involving the limited user profile may be associated with a privacy setting identifying one or more users capable of authorizing the interaction. Hence, if multiple users are identified as administrators of a limited user profile, various privacy settings may identify different users capable of authorizing different interactions with the limited user profile. For example, privacy settings associated with different types of interactions with the limited user profile identify different users, so different users are capable of authorizing different types of interactions involving the limited user profile.

A privacy setting associated with a limited user profile may also identify one or more characteristics of a connection between a user requesting and interaction with the limited user profile and a user identified as an administrator of the limited user profile to limit users authorized to perform the interaction with the limited user profile to users having the one or more characteristics. For example, a privacy setting specifies a type of connection between a requesting user and a user identified as an administrator of the limited user profile to limit requesting users authorized to perform a type of interaction associated with the limited user profile to requesting users having the specified type of connection to the user identified as an administrator of the limited user profile. Different privacy settings may specify different characteristics of requesting users, allowing requesting users having different characteristics (e.g., different types of connections to users identified as administrators of the limited user profile) to perform different types of interactions involving the limited user profile. Limited user profiles are further discussed below in conjunction with FIG. 3.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140. In one embodiment, the content store 210 includes one or more user identifiers that identify one or more social networking system users presented with a content item that are stored in association with the stored content item.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The authorization server 230 enforces one or more privacy settings of user profiles and limited user profiles associated with users of the social networking system 140. A privacy setting associated with a user profile determines how particular information included in the user profile may be shared, and may be stored in the user profile of a user in the user profile store 205 or stored in the authorization server 230 and associated with a user profile. As described above, a privacy setting associated with a limited user profile identifies one or more users capable of authorizing a type of interaction specified by the privacy setting that involves the limited user profile. In one embodiment, a privacy setting associated with a user profile specifies particular information associated with the user profile and identifies the entity or entities with whom the specified information may be shared. Examples of entities with which information mayn be shared may include other users, applications, third party systems 130 or any entity that may potentially access the information. Examples of information that may be shared by a user include user profile information like a profile image associated with the user, one or more phone numbers associated with the user, additional users connected to the user, actions taken by the user such as adding a connection, changing user profile information and the like.

A privacy setting associated with a user profile may specify access to information in the user profile at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user and included in a user profile. Specification of the set of entities that can access particular information may also be specified at various levels of granularity. Various sets of entities with which information can be shared may include, for example, all users connected to a user, a set of users connected to the user, additional users connected to users connected to the user, all applications, specific applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The authorization server 230 includes logic to determine if certain information associated with a user can be accessed by other social networking system users, a third-party system 130 and/or other applications and entities. For example, a third-party system 130 that attempts to access a user's comment about a uniform resource locator (URL) associated with the third-party system 130 is unable to access information associated with the user until granted authorization from the authorization server 230. Based on the user's privacy settings, the authorization server 230 determines if another user, a third-party system 130, an application or another entity is allowed to access information associated with the user, including information about actions taken by the user. For example, the authorization server 230 uses a user's privacy setting to determine if the user's comment about a uniform resource locator (URL) associated with the third-party system 130 may be presented to the third-party system 130 or may be presented to another user. Similarly, the authorization server 230 communicates a notification of a request to perform an interaction with or to access information in a limited user profile to a user identified by a privacy setting associated with the type of interaction and determines whether to authorize or to deny the interaction based on information received from the identified user in response to the notification. This enables a user's privacy setting to specify which other users, or other entities, are allowed to receive data about the user's actions or other data associated with the user.

The web server 235 links the social networking system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Maintaining a Limited User Profile for Social Networking System Users

Figure 3:
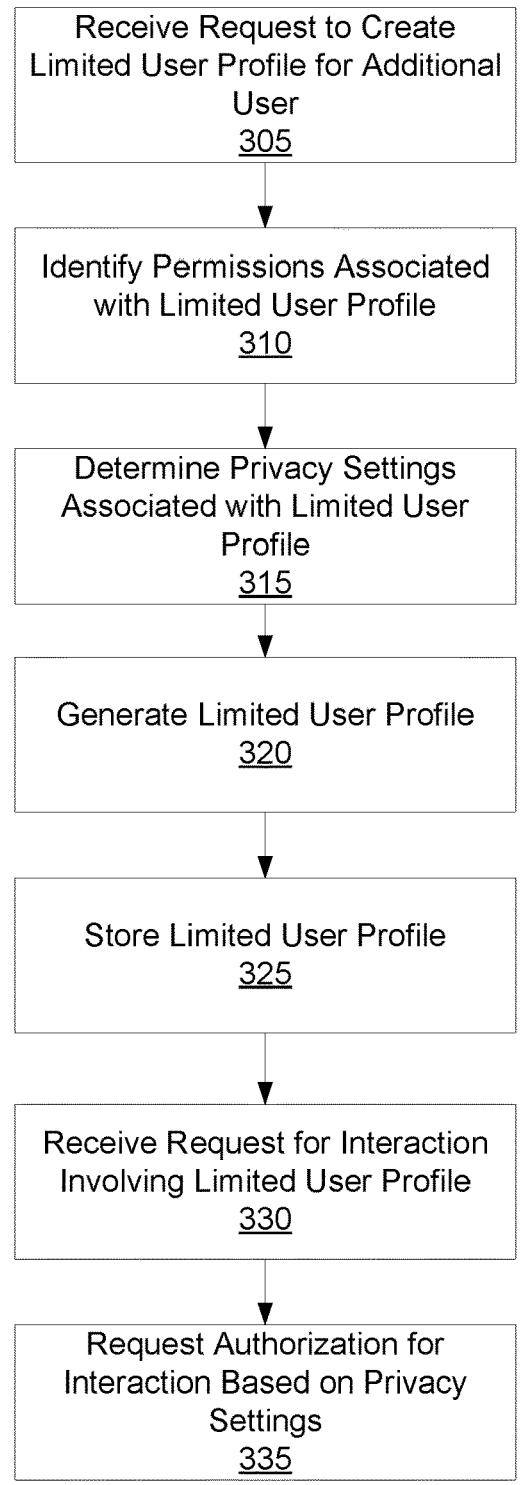
FIG. 3 is a flowchart of a method for maintaining a limited user profile associated with a user of a social networking system, in accordance with an embodiment.

FIG. 3 is flow chart of one embodiment of a method for maintaining a limited user profile associated with a user of a social networking system. In other embodiments, the method includes different, additional, or fewer steps than those depicted by FIG. 3. Additionally, in some embodiments, the steps described in conjunction with FIG. 3 may be performed in different orders.

The social networking system 140 receives 305 a request from a user to create a limited user profile associated with an additional user of the social networking system 140. In various embodiments, the additional user does not satisfy one or more criteria for the social networking system 140 to maintain a user profile. For example, the additional user has an age that is less than a threshold age for the social networking system 140 to maintain a user profile, such as an age specified by terms of service of the social networking system 140. The user requesting creation of the limited user profile has an association with the additional user, and may specify the association between the user and the additional user when requesting creation of the limited user profile. In some embodiments, the social networking system 140 prompts the user to provide information describing or verifying an association between the user and the additional user after receiving 305 the request to create the limited user profile. For example, a user requesting creation of a limited profile indicates that it is a parent or a guardian of the additional user. In some embodiments, the social networking system 140 receives 305 the request to create the limited user profile via the user's interaction with its user profile maintained by the social networking system 140. Alternatively, the user communicates a separate request to create a limited user profile to the social networking system 140.

The request to create the limited profile includes information describing the additional user. For example the request identifies a type associated with the additional user (e.g., child, baby, animal, other entity), an association between the user and the additional user, and one or more characteristics of the additional user. Example characteristics of the additional user include a name, a location (e.g., a hometown), an image, a gender, and one or more events associated with the additional user. Additionally, the request identifies one or more users as administrators associated with the limited user profile, with an administrator capable of modifying information included in a limited user profile, permissions associated with a limited user profile, or privacy settings associated with a limited user profile. For example, the user requesting creation of the limited user profile is identified as an administrator and may identify other users as administrators in the request or after the limited user profile is created.

In an alternative embodiment, the social networking system 140 prompts a user to create a limited user profile associated with the additional user of the social networking system 140 based on a characteristic, as described previously, determined of the additional user by application of a face analysis algorithm on an image of the additional user. The face analysis algorithm can be a face detection algorithm, iris detection algorithm, or any other suitable fingerprinting, identification or verification algorithm and determined characteristics include age, gender, relationship status, work history, academic history, location, timestamps, or any other suitable information that can be obtained from the social networking system 140. For example, if a determined age of the additional user is less than the known age or at least a threshold difference from the known age of the user, then the social networking system 140 can prompt the user to create the limited user profile associated with the additional user. In other embodiments, the social networking system 140 will only prompt the user to create a limited user profile associated with the additional user if a determined characteristic of the additional user by application of a face analysis algorithm exceeds a threshold probability or value associated with the determined characteristic. For example, if the determined characteristic is a determined age, then the social networking system 140 only prompts the user if the determined age exceeds a threshold age which may be an age specified by terms of service of the social networking system 140. In these embodiments, responsive to the prompt, the social networking system 140 can receive 305 a request to create the limited user profile associated with the additional user of the social networking system 140.

One or more permissions associated with the limited user profile are identified 310 by the social networking system 140. Fewer permissions are associated with the limited profile than are associated with a user profile. Permissions associated with the limited user profile identify interactions involving the limited user profile that are capable of being performed or interactions that are not authorized to be performed. In one embodiment, permissions specify interactions capable of being performed by other users that involve the additional user associated with the limited user profile, and permissions also specify interactions with other users capable of being performed by the additional user associated with the limited user profile. For example, a permission associated with the limited user profile prevent the social networking system 140 from displaying a profile page including information in the limited user profile, prevents the additional user from communicating messages to other users, or prevents the additional user from posting content to the social networking system 140 that is associated with the limited user profile. The social networking system 140 may identify 310 permissions associated with the limited user profile based on information in the received request, allowing the user requesting creation of the limited user profile to specify actions involving the limited user profile that are capable of being performed. Alternatively, the social networking system 140 may identify 310 permissions associated with the limited user profile based on stored information identifying a set of permissions associated with a limited user profile.

In some embodiments, permissions associated with the limited user profile may subsequently be modified by the user requesting creation of the limited user profile or by another user identified as an administrator associated with the limited user profile. Additionally, permissions associated with the limited user profile may be modified based on characteristics of the additional user associated with the limited user profile. For example, as characteristics of the additional user satisfy various criteria, permissions associated with the limited user profile are modified to increase the types of actions capable of being performed that involve the limited user profile. As an example, as an age of the additional user associated with the limited user profile increases, permissions associated with the limited user profile are modified to allow performance of a greater number of types of interactions involving the limited user profile.

Additionally, the social networking system 140 determines 315 one or more privacy settings associated with the limited user profile. A privacy setting associated with the limited user profile determines accessibility of information in the limited user profile to other social networking system users or determines interaction with the limited user profile by other social networking system users. In various embodiments, a privacy setting associated with a limited user profile identifies a type of interaction with the limited user profile and one or more users capable of authorizing the type of interaction with the limited user profile. For example, a privacy setting identifies establishment of a connection between a user and the additional user associated with the limited user profile and specifies an administrator associated with the limited user profile capable of authorizing establishment of a connection with the limited user profile. As another example, a privacy setting identifies one or more users capable of authorizing an association between the limited user profile and content (e.g., tagging the user associated with the limited user profile in an image); when another social networking system user requests to associate the user associated with the limited user profile with content, one or more users identified by the privacy setting are notified. Based on a response to the notification received from one or more of the identified users, the social networking system 140 determines whether the other social networking system user may associate content with the limited user profile. Examples of interactions associated with a privacy setting for a limited user profile include: associating content with the user associated with the limited user profile, accessing content associated with the user associated with the limited user profile, establishing a connection with the user associated with the limited user profile, and receiving information describing content associated with the user associated with the limited user profile.

The privacy settings associated with the limited user profile may be determined 315 based on information in the received request. Alternatively, the social networking system 140 may determine 315 privacy settings associated with the limited user profile based on settings or configuration information maintained by the social networking system 140. Additionally, users identified as administrators of the limited user profile may specify or modify privacy settings associated with the limited user profile.

Based on information included in the request to create the limited user profile, the identified permissions, and the determined privacy settings, the social networking system 140 generates 320 the limited user profile, which is stored 325 by the social networking system 140. A connection between the limited user profile and the user who requested creation of the limited user profile is stored 325 with the limited user profile. For example, a connection between the limited user profile and a user profile associated with the user who requested creation of the limited user profile is stored 325. Additionally, connections between other users identified as administrators of the limited user profile and the user profile may also be stored 325 in conjunction with the limited user profile. For example, if the additional user is a child, basic profile information describing the child are included in the limited user profile along with and permissions, privacy settings, and identifiers of users who are administrators of the limited user profile (e.g., identifiers of one or more users who are parents or guardians of the child). As described above, the user who requested creation of the limited user profile and other users identified as administrators of the limited user profile may modify information describing the additional user in the limited user profile, modify permissions associated with the limited user profile, or modify privacy settings associated with the limited user profile.

After storing 325 the limited user profile, the social networking system receives 330 a request from a requesting user of the social networking system 140 to perform an interaction involving the limited user profile. For example, a requesting user requests to associate content maintained by the social networking system 140 with the limited user profile (e.g., tag an image with an identifier of the limited user profile). Other examples of requests for interaction with the limited user profile include a request to establish a connection between a requesting user's user profile and the limited user profile and a request from the requesting user to receive content associated with the limited user profile (e.g., indications of content in which the limited user profile is tagged or otherwise identified).

When a request for an interaction with the limited user profile is received 330, the social networking system 140 identifies a type of the interaction and determines a user capable of authorizing the type of action from the privacy settings associated with the limited user profile. The social networking system requests 335 authorization of the interaction from the user capable of authorizing the type of action to determine whether to perform the requested interaction. Based on a response to the request from the user capable of authorizing the type of action, the social networking system 140 authorizes or denies the requested interaction. If the response to the request authorizes the interaction, the social networking system 140 performs the requested interaction and updates information associated with the limited user profile to indicate performance of the interaction. For example, if a requesting user requests 330 to tag the additional user associated with the limited user profile in an image, the social networking system requests 335 authorization of the tagging from a user identified by a privacy setting as capable of authorizing the tagging. The request may identify the requesting user and information describing a connection between the requesting user and the limited user profile or a connection between the requesting user and a user identified as an administrator of the limited user profile. If the identified user authorizes the tagging, the social networking system 140 stores information associating the limited user profile with the image.

In some embodiments, a privacy setting associated with a type of interaction specifies one or more criteria for a requesting user to satisfy. If the requesting user does not satisfy a threshold number of the criteria, a request by the requesting user to perform the type of interaction is denied without requesting 335 authorization from a user identified from the privacy setting. For example, a privacy setting may limit performance of a type of interaction with the limited user profile to requesting users having a specified type of connection with the limited user profile (e.g., a connection indicating a familial relationship between the requesting user and the limited user profile). In some embodiments, if a requesting user satisfies the criteria specified by a privacy setting associated with a type of interaction, the social networking system 140 authorizes performance of the time of interaction without requesting authorization to perform the type of interaction from a user associated with the type of interaction by the privacy setting.

A privacy setting may identify multiple users capable of authorizing an interaction involving the limited user profile and specify a threshold number of the identified users to authorize the interaction. When a request for an interaction with the limited user profile is received 330, authorization is requested 335 from each of the multiple identified users. If at least the threshold number of identified users authorizes the requested interaction, the social networking system 140 performs the requested interaction. However, if less than the threshold number of identified users authorize the requested interaction, the social networking system 140 does not perform the requested interaction.

If an interaction involving the limited user profile is authorized and performed by the social networking system 140, information describing the interaction may be presented to other social networking system users connected to the additional user associated with the limited user profile. For example, content in which the additional user associated with the limited user profile is tagged is communicated to social networking system users with a connection to the additional user or social networking system users that requested notification of content associated with the additional user. In an additional example, content associated with the additional user is presented by the social networking system 140 in search results for a search query identifying the additional user (e.g., a search query specifying a name associated with the additional user).

Additionally, interactions involving the limited user profile may also be associated with user profiles of one or more administrators of the limited user profile. For example, users connected to an administrator of the limited user profile are presented with information identifying content associated with the limited user profile, information describing connections established with the limited user profile, or other interactions involving the limited user profile. Similarly, information describing interactions involving the limited user profile are presented in a profile page including content associated with one or more administrators of the limited user profile, allowing social networking system users to be informed of interactions that involve the limited user profile.

In some embodiments, if a social networking system user elects to not receive information describing interactions associated with an administrator of the limited user profile, the social networking system user also does not received information describing interactions involving the limited user profile.

When the additional user satisfies criteria for the social networking system to maintain a user profile associated with the additional user, the social networking system 140 generates the user profile for the additional user based on the information included in the limited user profile, connections between users and the additional user associated with the limited user profiled, and interactions involving the limited user profile. For example, when the additional user reaches a threshold age, a user profile is generated based on the limited user profile, so the generated user profile includes the information included in the limited user profile, has connections to other social networking system users that have connections to the limited user profile, and is associated with content that is associated with the limited user profile. In another example, content associated with an additional user associated with a limited user profile is associated with the user profile generated from the limited user profile and is presented in a profile page generated from the user profile. Additionally, connections established between the additional user and other social networking system users while the additional user was associated with the limited user profile are associated with the user profile generated from the limited user profile, allowing the user profile to maintain connections established while the additional user was associated with the limited user profile.

In one embodiment, a notification is communicated to an administrator associated with the limited user profile when the additional user satisfies criteria for the social networking system 140 to maintain a user profile for the additional user. If the administrator responds to the notification with an instruction to generate a user profile, the social networking system 140 generates a user profile based on information included in and associated with the limited user profile. For example, a message (e.g., an e-mail) is sent to an administrator identified by a limited user profile including instructions for generating a user profile based on the limited user profile; in some embodiments, the message includes a code for the administrator to provide to the social networking system 140 to confirm the administrator's identity.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising: determining, for a user who is an administrator of a limited user profile of an additional user of an online system, that the additional user now satisfies criteria to have a regular user profile that is not limited, wherein the limited user profile includes one or more permissions specifying fewer permissions than associated with the regular user profile maintained by the online system: communicating a notification to the user who is the administrator of the limited user profile that the additional user now satisfies the criteria; receiving, from the administrator, a response to the notification instructing the online system to generate a regular user profile that is not limited for the additional user; responsive to the received response from the administrator, generating the regular user profile for the additional user based on the limited user profile such that the generated regular user profile includes information, connections, and content that was associated with the limited user profile; storing the generated regular user profile for the additional user and a connection between the generated regular user profile and the administrator; and associating the additional user with new content maintained by the online system based on a connection of the additional user requesting the content be associated with the additional user, the association occurring without requiring approval of the administrator.

2. The method of claim 1, further comprising: before the user is determined to satisfy the criteria for a regular user profile that is not limited: receiving a request from a user of the online system to associate the limited user profile of the additional user with content maintained by the online system; identifying a user capable of authorizing association of the additional user with content maintained by the online system; communicating information describing the received request to associate the limited user profile of the additional user with content maintained by the online system to the identified user; and associating the additional user with the content maintained by the online system if the identified user approves the request to associate the limited user profile of the additional user with content maintained by the online system.

3. The method of claim 2, wherein communicating information describing the received request to the identified user comprises: determining whether the requesting user is connected to the additional user associated with the limited user profile; and communicating the information describing the received request to associate the additional user with content maintained by the online system to the identified user in response to determining the requesting user is connected to the additional user associated with the limited user profile.

4. The method of claim 3, wherein communicating information describing the received request to the user associated with the limited user profile of the additional user further comprises: denying the received request to associate the additional user with content maintained by the online system in response to determining the requesting user is not connected to the additional user associated with the limited user profile.

5. The method of claim 1, further comprising receiving a request from the connection of the additional user to tag the additional user now having the generated regular user profile in content maintained by the online system; and tagging the additional user in the content maintained by the online system without requiring approval of the administrator.

6. The method of claim 1, further comprising: receiving a request from a requesting user of the online system to establish a connection with the additional user now having the generated regular user profile; and establishing the connection between the requesting user and the additional user without requiring approval of the administrator.

7. The method of claim 1, further comprising: receiving a request from a requesting user of the online system to receive content associated with the additional user now having the generated regular user profile; and presenting content associated with the additional user to the requesting user without requiring approval of the administrator.

8. The method of claim 1, wherein the additional user satisfies the criteria for a regular user profile that is not limited when the additional user reaches a threshold age.

9. The method of claim 1, wherein content that was associated with the limited user profile of the additional user is associated with the generated regular user profile and is presented in a profile page created from the generated regular user profile.

10. The method of claim 1, wherein connections established between the additional user and other users while the additional user had a limited user profile are associated with the generated regular user profile, allowing the generated regular user profile to maintain connection established while the additional user had a limited user profile.

11. The method of claim 1, wherein communicating a notification to the administrator comprises sending a message to the administrator of the limited user profile including a code for the administrator to provide to the online system to confirm identify of the administrator.

12. The method of claim 1, further comprising: before the user is determined to satisfy the criteria for a regular user profile that is not limited, prompting the user of the online system to create a limited user profile for the additional user based on a characteristic determined of the additional user by application of a face analysis algorithm on an image of the additional user.

13. The method of claim 12, wherein the characteristic is determined from a group consisting of: age, gender, relationship status, work history, academic history, location, timestamps, and any combination thereof.

14. A computer program product comprising a non-transitory computer readable storage medium having instructions encoded thereon that, when executed by a processor, cause the processor to: determine, for a user who is an administrator of a limited user profile of an additional user of an online system, that the additional user now satisfies criteria to have a regular user profile that is not limited, wherein the limited user profile includes one or more permissions specifying fewer permissions than associated with the regular user profile maintained by the online system: communicate a notification to the user who is the administrator of the limited user profile that the additional user now satisfies the criteria; receive, from the administrator, a response to the notification instructing the online system to generate a regular user profile that is not limited for the additional user; responsive to the received response from the administrator, generate the regular user profile for the additional user based on the limited user profile such that the generated regular user profile includes information, connections, and content that was associated with the limited user profile; store the generated regular user profile for the additional user and a connection between the generated regular user profile and the administrator; and associate the additional user with new content maintained by the online system based on a connection of the additional user requesting the content be associated with the additional user, the association occurring without requiring approval of the administrator.

15. The computer program product of claim 14, wherein the computer readable storage medium further has instructions encoded thereon that, when executed by the processor, cause the processor to: before the user is determined to satisfy the criteria for a regular user profile that is not limited: receive a request from a user of the online system to associate the limited user profile of the additional user with content maintained by the online system; identify a user capable of authorizing association of the additional user with content maintained by the online system; communicate information describing the received request to associate the limited user profile of the additional user with content maintained by the online system to the identified user; and associate the additional user with the content maintained by the online system if the identified user approves the request to associate the limited user profile of the additional user with content maintained by the online system.

16. The computer program product of claim 15, wherein communicate information describing the received request to the identified user comprises: determine whether the requesting user is connected to the additional user associated with the limited user profile; and communicate the information describing the received request to associate the additional user with content maintained by the online system to the identified user in response to determining the requesting user is connected to the additional user associated with the limited user profile.

17. The computer program product of claim 16, wherein communicate information describing the received request to the user associated with the additional user further comprises: deny the received request to associate the additional user with content maintained by the online system in response to determining the requesting user is not connected to the additional user associated with the limited user profile.

18. The computer program product of claim 14, wherein the computer readable storage medium further has instructions encoded thereon that, when executed by the processor, cause the processor to: receive a request from the connection of the additional user to tag the additional user now having the generated regular user profile in content maintained by the online system; and tag the additional user in the content maintained by the online system without requiring approval of the administrator.

19. The computer program product of claim 15, wherein the request specifies an association of the user with the additional user.

20. The computer program product of claim 19, wherein the specified association is based on the user representing a parent and the additional user representing a child of the user.

* * * * *

UNITED STATES PATENT AND TRADEMARK OFFICE
CERTIFICATE OF CORRECTION

PATENT NO. : 10,362,038 B2  
APPLICATION NO. : 15/845661  
DATED : July 23, 2019  
INVENTOR(S) : Holson et al.

Page 1 of 1

It is certified that error appears in the above-identified patent and that said Letters Patent is hereby corrected as shown below:

In the Claims

In Column 17, Claim 1, Line 48, delete "system:" and insert -- system; --, therefor.

In Column 18, Claim 5, Line 31, delete "comprising" and insert -- comprising: --, therefor.

In Column 18, Claim 11, Line 67, delete "identify" and insert -- identity --, therefor.

In Column 19, Claim 14, Line 22, delete "system:" and insert -- system; --, therefor.

Signed and Sealed this
Twenty-fourth Day of December, 2019

Andrei Iancu
*Director of the United States Patent and Trademark Office*